(12) United States Patent
Siebeneick

(10) Patent No.: US 8,215,653 B2
(45) Date of Patent: Jul. 10, 2012

(54) STEERING KNUCKLE FOR A VEHICLE

(75) Inventor: Jürgen Siebeneick, Oberwesel (DE)

(73) Assignee: GM Global Technology Operations LLC, Detroit, MI (US)

( * ) Notice: Subject to any disclaimer, the term of this patent is extended or adjusted under 35 U.S.C. 154(b) by 91 days.

(21) Appl. No.: 12/295,756

(22) PCT Filed: Apr. 6, 2007

(86) PCT No.: PCT/EP2007/003139
§ 371 (c)(1),
(2), (4) Date: Mar. 23, 2009

(87) PCT Pub. No.: WO2007/118629
PCT Pub. Date: Oct. 25, 2007

(65) Prior Publication Data
US 2009/0261550 A1    Oct. 22, 2009

(30) Foreign Application Priority Data

Apr. 10, 2006  (DE) .......................... 10 2006 016 762

(51) Int. Cl.
*B62D 7/18*    (2006.01)
*B62D 17/00*   (2006.01)

(52) U.S. Cl. ............... 280/93.512; 280/5.52; 280/5.523; 280/86.75; 280/86.758

(58) Field of Classification Search ...... 280/5.52–5.524, 280/93.512, 86.75, 86.758, 124.128
See application file for complete search history.

(56) References Cited

U.S. PATENT DOCUMENTS

| | | | |
|---|---|---|---|
| 4,155,566 A | 5/1979 | Kroniger | |
| 4,556,238 A * | 12/1985 | Matschinsky | 280/124.135 |
| 6,170,838 B1 * | 1/2001 | Laurent et al. | 280/5.508 |
| 6,173,977 B1 * | 1/2001 | Fun | 280/124.116 |
| 6,241,262 B1 * | 6/2001 | Suess | 280/5.522 |
| 6,776,425 B2 * | 8/2004 | Britton | 280/86.75 |
| 6,974,138 B2 * | 12/2005 | Perello et al. | 280/5.522 |
| 7,270,340 B2 * | 9/2007 | Mosler | 280/93.512 |
| 2002/0036385 A1 * | 3/2002 | Mackle et al. | 280/5.521 |
| 2010/0052271 A1 * | 3/2010 | Vaxelaire et al. | 280/5.524 |

FOREIGN PATENT DOCUMENTS

| | | | |
|---|---|---|---|
| DE | 2715143 A1 | | 10/1978 |
| DE | 31 39 792 | * | 4/1983 |
| DE | 3808490 A1 | | 10/1988 |
| DE | 10210556 A1 | | 10/2002 |
| FR | 2701001 A1 | | 8/1994 |
| FR | 2794688 A1 | | 12/2000 |
| FR | 2853281 A1 | | 10/2004 |
| FR | 2855459 A1 | | 12/2004 |
| FR | 2860751 A1 | | 4/2005 |
| JP | 3045409 | | 2/1991 |
| RU | 2238192 C2 | | 10/2004 |
| WO | 2004089665 A1 | | 10/2004 |
| WO | 2004108444 A1 | | 12/2004 |

* cited by examiner

*Primary Examiner* — Ruth Ilan
(74) *Attorney, Agent, or Firm* — Ingrassia Fisher & Lorenz, P.C.

(57) ABSTRACT

A steering knuckle for a wheel of a vehicle is provided, particularly a motor vehicle, with a wheel bearing mounting section that serves for mounting the wheel bearing and with a control arm mounting section that serves for mounting control arms. The wheel bearing mounting section can be elastically pivoted relative to the control arm mounting section.

7 Claims, 4 Drawing Sheets

STEERING KNUCKLE FOR A VEHICLE

CROSS-REFERENCE TO RELATED APPLICATIONS

This application is a U.S. National-Stage entry under 35 U.S.C. §371 based on International Application No. PCT/EP2007/003139, filed Apr. 6, 2007, which was published under PCT Article 21(2) and which claims priority to German Application No. 102006016762.7, filed Apr. 10, 2006, which are all hereby incorporated in their entirety by reference.

TECHNICAL FIELD

The technical field generally relates to automotive engineering, and specifically to a steering knuckle for a vehicle, particularly a motor vehicle.

BACKGROUND

In conventional motor vehicles, a steering movement of a vehicle wheel is realized with a pivoted steering knuckle ("corner") that forms part of the wheel suspension. In this case, a wheel bearing unit fixed on the steering knuckle serves for mounting the vehicle wheel. Toward the center of the vehicle, the steering knuckle is mounted on the chassis, particularly on a subframe, by means of wheel guiding elements ("control arms"). It is common practice to define pivot points for the steering knuckle with upper and lower control arms that engage on the steering knuckle. The connecting line between the two pivot points forms the usually oblique pivoting axis for the pivoting motion of the steering knuckle. In order to pivot the steering knuckle and thusly turn a wheel mounted on the steering knuckle, it is possible, for example, to provide a steering arm (knuckle arm) that engages on the steering knuckle and to which the steering forces are transmitted, for example, by means of A-arms. Due to its pivoting function for the wheel mounted on the steering knuckle, the steering knuckle frequently is simply referred to as a pivot bearing of the wheel.

In addition to transmitting the steering movement to the mounted wheel, the steering knuckle also needs to absorb the forces applied to the wheel because not only the weight of the vehicle, but practically all forces for the longitudinal and lateral deceleration of the vehicle are applied to the steering knuckle such that the steering knuckle needs to be realized in a correspondingly stable fashion.

The moving direction of the wheel mounted on the steering knuckle therefore can be defined by means of the steering knuckle. When driving straight ahead, the moving direction of the wheels should ideally be parallel to the longitudinal axis of the vehicle at all times, but this is frequently not the case, for example, because the front wheels of a front-wheel drive vehicle are usually pressed inward ("toe-in") when the vehicle accelerates due to elastic deformations in components of the wheel suspension. During an ideal cornering maneuver or so-called neutral handling, all wheels are exactly turned in such a way that the ideal toe angle is adjusted. At a certain curve radius and a certain speed, this ideal wheel position should make it possible to build up a cornering force in the tire that is proportional to the normal force of the respective wheel. Referred to the axle, this means that the cornering forces need to build up in accordance with the axial load ratio. If this is not the case, oversteering or understeering will occur.

In torsion beam rear axles, in particular, in which the control arms are connected by a cross arm in order to improve the handling, it is known that the wheels have a tendency to oversteer while cornering such that, in contrast to ideal cornering, all wheels of the vehicle are no longer optimally positioned for this type of cornering. This may have the undesirable consequence that the rear end of the vehicle breaks away more easily while cornering.

In order to solve, in particular, the aforementioned problem of torsion beam rear axles, it was already considered to realize an active adjustment of the steering knuckles that carry the wheels, namely by means of an actuator. The technical realization of such an active adjustment of the steering knuckle, however, requires significant constructive expenditures because the respective steering knuckles usually need to be provided with two bearing points with bushings in order to achieve a rotatory degree of freedom. In addition, corresponding thrust washers or axial bearings need to be provided perpendicular thereto in order to transmit the forces for pivoting the steering knuckle. Such bearing points should furthermore be free of play and smooth-moving, as well as sealed against water and environmental influences, and also have a suitable rigidity in order to fulfill the specifications with respect to the properties of the chassis. In addition, it is necessary to provide a steering arm, to which the actuator is coupled.

Other known systems designed for solving this problem are configured for special axle systems and either not suitable for other axle systems or do not define the steering axle satisfactorily.

In view of the foregoing, at least one objective is to develop a steering knuckle that makes it possible to adjust the moving direction of the vehicle wheel in the desired fashion, for example, in order to counteract the oversteering of torsion beam rear axles. In addition, other objectives, desirable features, and characteristics will become apparent from the subsequent summary and detailed description, and the appended claims, taken in conjunction with the accompanying drawings and this background.

SUMMARY

According to the invention, this objective, other objectives, desirable features, and characteristics, are attained with a steering knuckle (or steering knuckle arrangement or wheel suspension) for a wheel of a vehicle, particularly a motor vehicle, features a wheel bearing mounting section that serves for mounting the wheel bearing and a control arm mounting section that serves for mounting control arms ("control arms"). In this case, it is important that the wheel bearing mounting section that serves for mounting the wheel bearing can be elastically pivoted relative to the control arm mounting section. Due to the ability to elastically pivot the wheel bearing mounting section relative to the control arm mounting section, an adjustment of the steering angle or an adjustment of the moving direction in the toe-in or toe-out direction of the wheel mounted on the wheel bearing can be easily realized.

The ability to elastically pivot the wheel bearing mounting section relative to the control arm mounting section can be realized with at least one elastically deformable section of the steering knuckle, for example, an elastically deformable connecting element that connects the wheel bearing mounting section and the control arm mounting section. At least one first elastic spring element, particularly in the form of a leaf spring, may furthermore be provided for this purpose. In the inventive steering knuckle, the at least one first elastic spring element, particularly a leaf spring, may define a pivoting axis for pivoting the wheel bearing mounting section relative to the control arm mounting section.

In one advantageous embodiment of the inventive steering knuckle, a pivoting axis, about which the wheel bearing mounting section can be elastically pivoted relative to the control arm mounting section, is oriented in such a way that it traverses a contact plane of the wheel that lies parallel to a center axis of the wheel and contains a contact line of the wheel that is assumed to be ideally round in the contact point behind (i.e., on the rear side of) the contact line of the wheel referred to the longitudinal direction of the vehicle. In this design of the inventive steering knuckle, understeering of the wheel can be realized in a particularly simple fashion by means of the lateral forces that occur while cornering and the thusly caused leverage acting upon the wheel bearing mounting section. If this design of the inventive steering knuckle concerns the steering knuckle of the torsion beam rear axle, it is possible to counteract the oversteering of the wheels that usually occurs with this type of axle in a particularly simple fashion. In this case, a separate actuating element (actuator) for pivoting the wheel bearing mounting section relative to the control arm mounting section is not required.

In another advantageous embodiment of the inventive steering knuckle, the pivoting axis, about which the wheel bearing mounting section can be elastically pivoted relative to the control arm mounting section, is oriented in such a way that it traverses the contact plane of the wheel in front (i.e., on the front side) of the wheel contact line of the wheel. In this design of the inventive steering knuckle, oversteering of the wheel can be realized in a particularly simple fashion with the lateral forces that occur while cornering and the thusly caused leverage such that possible understeering of the wheel can be counteracted.

It is furthermore possible to provide at least one second elastic spring element instead of the actuating element (actuator) for pivoting the wheel bearing mounting section relative to the control arm mounting section. This spring element engages on the wheel bearing mounting section in such a way that the desired pivoting of the wheel bearing mounting section is realized and a desired toe-in angle is adjusted due to its rigidity, if applicable, in combination with the rigidity of the at least one first elastic spring element that connects the wheel bearing mounting section and the control arm mounting section.

In another advantageous embodiment of the inventive steering knuckle, a suitably arranged actuator is provided for pivoting the wheel bearing mounting section relative to the control arm mounting section. The actuator engages, in particular, on the wheel bearing a mounting section. This actuator may consist, for example, of a hydraulic actuating cylinder. A control device is provided for controlling the actuator. It is particularly advantageous to arrange an actuator that engages on the wheel bearing mounting section and makes it possible to pivot the wheel bearing mounting section relative to the control arm mounting section on the control arm mounting section. This advantageously makes it possible to realize an integral arrangement of the actuator in the steering knuckle.

If an actuator is provided for pivoting the wheel bearing mounting section relative to the control arm mounting section, the steering knuckle is advantageously realized such that the pivoting axis, about which the wheel bearing mounting section can be elastically pivoted relative to the control arm mounting section, is oriented in such a way that it extends through the contact plane of the wheel or, alternatively, intersects the contact line in the vicinity of the contact line of the wheel. The forces acting upon the wheel bearing mounting section and therefore the actuator engaging thereon are minimized or eliminated by the lateral forces acting upon the wheel while cornering.

In the inventive steering knuckle, the wheel bearing mounting section and the control arm mounting section may be realized in one piece.

The invention furthermore pertains to a vehicle axle, particularly a torsion beam rear axle of a vehicle, particularly a motor vehicle that features at least one inventive steering knuckle.

The invention furthermore pertains to a vehicle, particularly a motor vehicle that features at least one inventive steering knuckle.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit application and uses. Furthermore, there is no intention to be bound by any theory presented in the preceding summary and background or the following detailed description.

Figure 1:
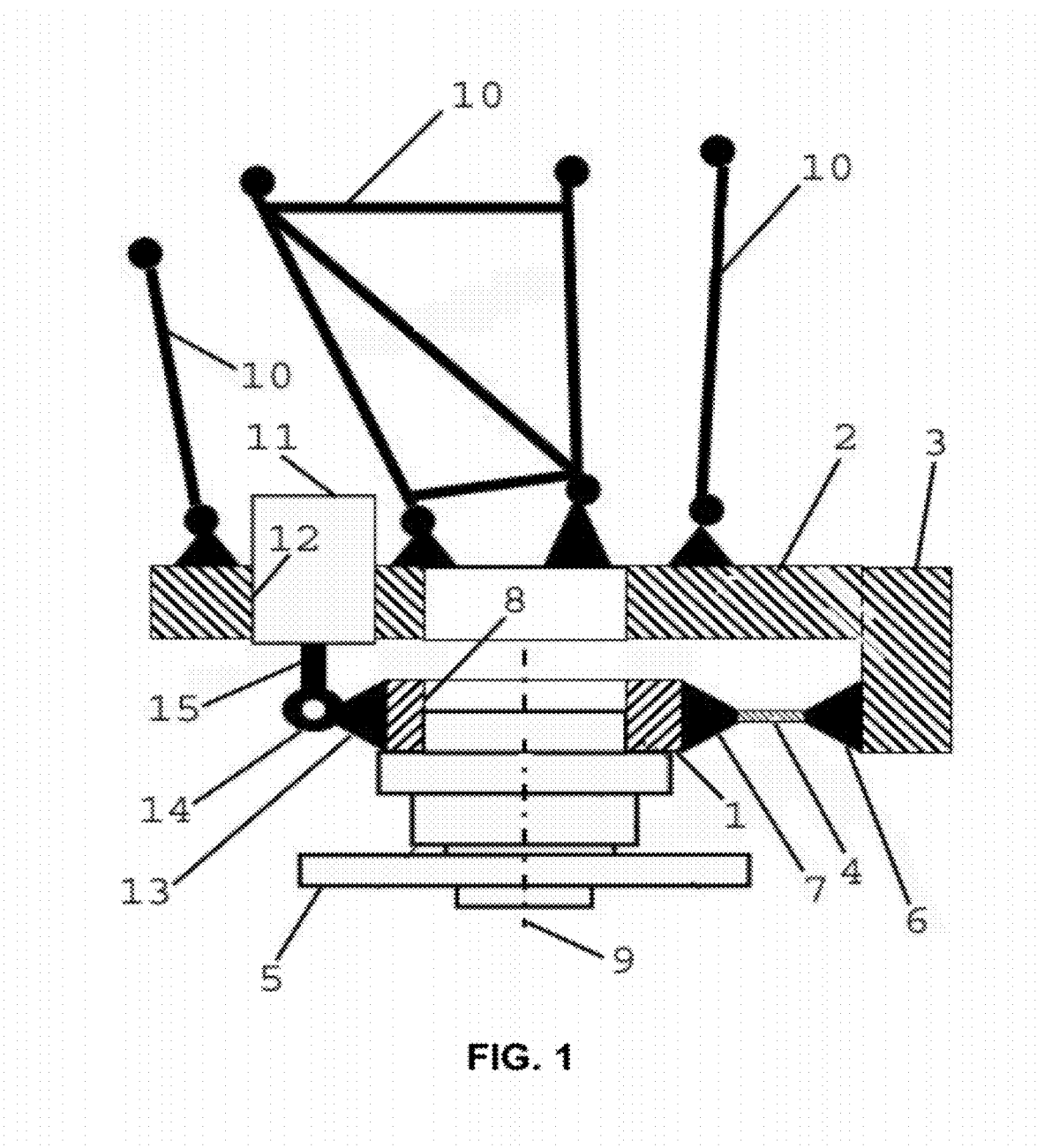
FIG. 1 shows a schematic top view of the basic design of a first embodiment of the inventive steering knuckle.
Figure 2:
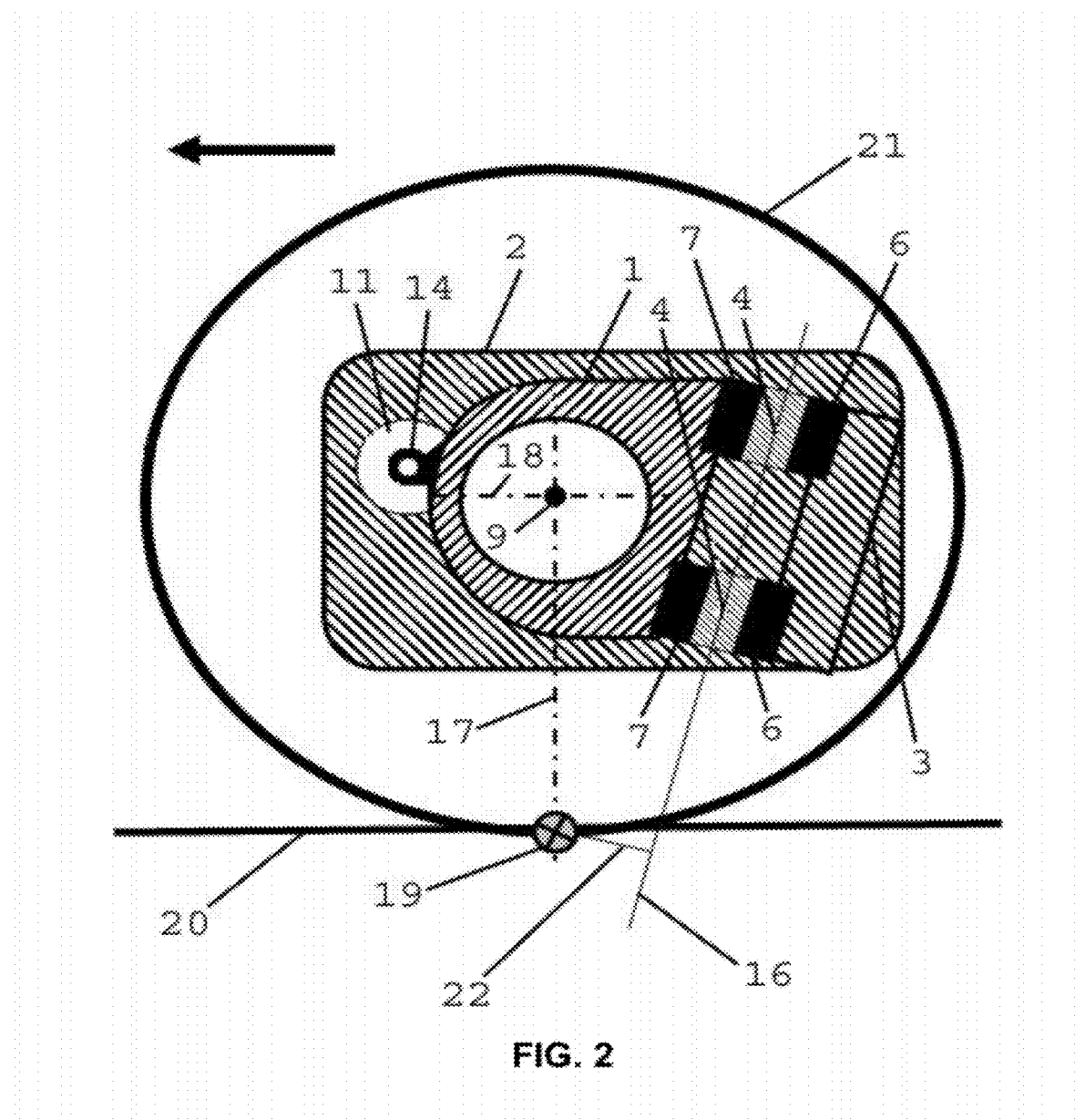
FIG. 2 shows a schematic side view of the basic design of the first embodiment of the inventive steering knuckle according to FIG. 1 with a vehicle wheel.

The description of the drawings initially refers to FIG. 1 and FIG. 2, in which a first embodiment of the inventive steering knuckle is schematically illustrated in the form of a top view and a side view.

Figure 3:
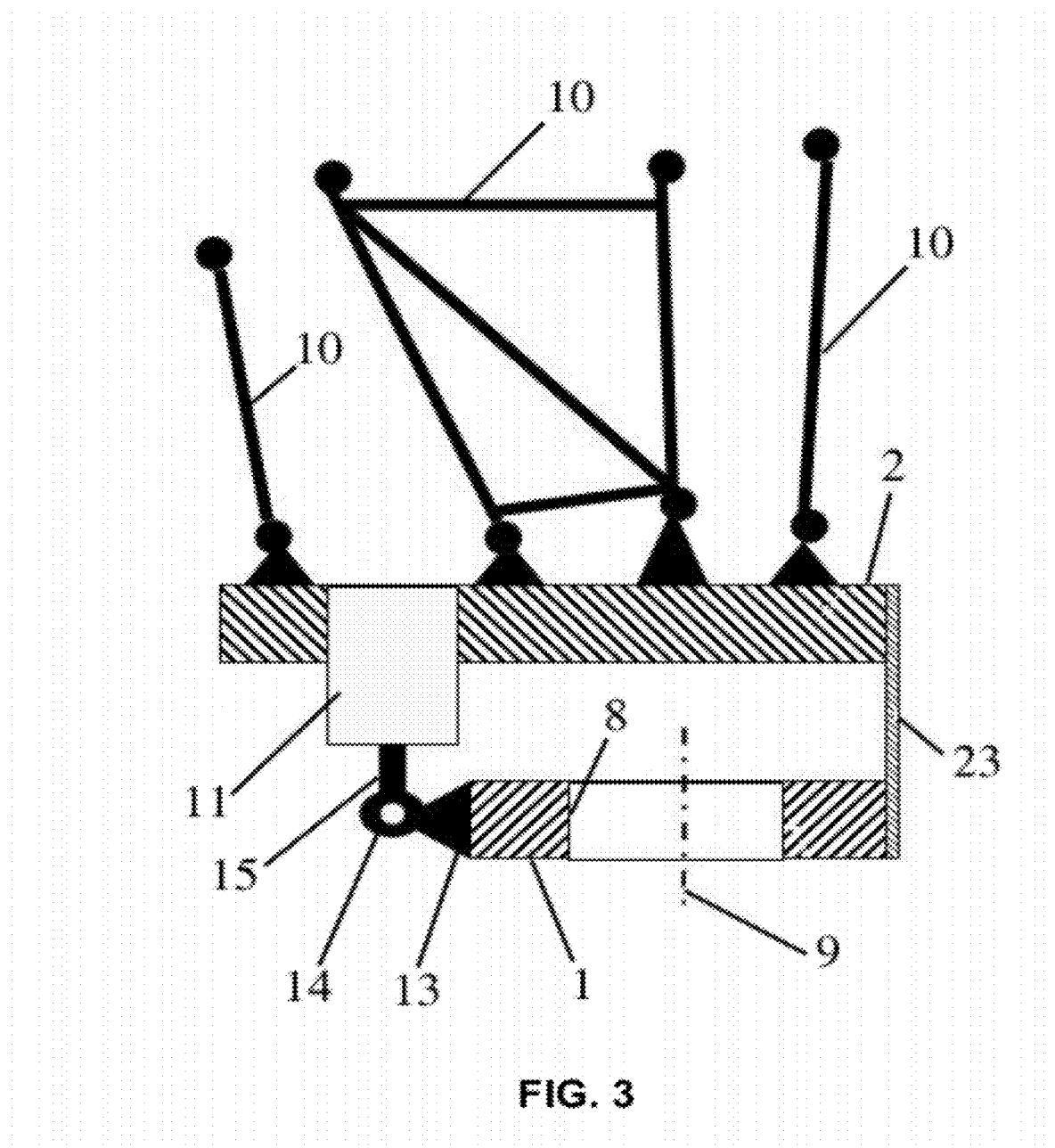
FIG. 3 shows a schematic top view of the basic design of a second embodiment of the inventive steering knuckle.

An inventive steering knuckle according to the embodiment illustrated in FIG. 1 to FIG. 3 comprises a wheel bearing mounting section 1 that is collectively identified by the reference symbol 1 and a control arm mounting section 2 that is collectively identified by the reference symbol 2. In addition, two parallel leaf springs 4 are arranged at a certain distance from one another and connected to a face of the wheel bearing mounting section 1 that is directed toward the leaf springs on one end and to a connecting section 3 on the other end, namely by means of respective attachments 6, 7, between which the two leaf springs are fixed. The connecting section 3, in turn, is connected to a face of the control arm mounting section 2 such that the wheel bearing mounting section 1 and the control arm mounting section 2 are connected to one another by the connecting section 3 and the two leaf springs 4.

A wheel bearing unit for mounting the vehicle wheel is collectively identified by the reference symbol 5 and mounted on the wheel bearing mounting section 1. The wheel bearing unit comprises a mounting flange for mounting the vehicle wheel that is not individually identified and a brake rotor that is also not individually identified. The wheel bearing unit 5 is partially accommodated in a through-hole 8 of the wheel bearing mounting section in this case. The wheel center axis is indicated with a dot-dash line 9. If the vehicle features disc brakes, a (not-shown) brake caliper of the brake rotor is also mounted on the wheel bearing mounting section 1. If a drum brake is provided rather than a disc brake, a drum brake unit is mounted on the wheel bearing mounting section.

On the side that is directed away from the wheel, several control arms 10 engage on the control arm mounting section 2. The control arms are arranged on the chassis or on the subframe of the vehicle in the installed state. In a torsion beam rear axle, in particular, these control arms are connected to the control arms of the steering knuckle of both wheels of the same axle by a cross arm.

An actuator 11 for pivoting the wheel bearing mounting section relative to the control arm mounting section is also arranged in a through-hole in the control arm mounting section 2. The actuator 11 that may consist, for example, of a hydraulic actuating cylinder with an actuating arm 15 that can be displaced in its longitudinal direction and is connected to an attachment 13 by means of an articulated connection 14, for example, a ball-and-socket joint or a hinge joint, wherein said attachment is arranged on a face of the wheel bearing mounting section that is directed away from the leaf springs. When the actuator is actuated (i.e., when the actuating arm 15 is pushed forward or pulled backward along its longitudinal direction), the wheel bearing mounting section 11 can be pivoted relative to the control arm mounting section. The ability to elastically pivot the wheel bearing mounting section 1 relative to the control arm mounting section is realized with the leaf springs 4 in the embodiment shown.

Another elastic spring element may be provided instead of the actuator and engage on the wheel bearing mounting section in such a way that the desired pivoting of the wheel bearing mounting section is realized and the desired toe-in angle is adjusted due to its rigidity in combination with the rigidity of the elastic leaf springs that connect the wheel bearing mounting section to the control arm mounting section.

FIG. 2 shows, in particular, the wheel 21 that is mounted on the steering knuckle and contacts a contact plane 20 in a contact line 19 if the wheel 21 is assumed to be ideally round. FIG. 2 furthermore shows that a pivoting axis 16 for pivoting the wheel bearing mounting section 1 relative to the control arm mounting section 2 is defined by the two leaf springs 4 that are arranged at a certain distance from one another. The two leaf springs 4 are aligned relative to the wheel bearing mounting section 1 in such a way that the pivoting axis 16 assumes an angle other than 0° relative a vertical 17 on the wheel contact plane. In other words, the pivoting axis 16 is not aligned parallel to the vertical 17. The arrow in FIG. 2 indicates the normal forward driving direction of the wheel 21. The pivoting axis 16, about which the wheel bearing mounting section can be elastically pivoted relative to the control arm mounting section, is aligned, in particular, in such a way that it traverses the contact plane 20 behind the contact line 19 of the wheel 21. The vertical connection 22 between the pivoting axis 16 and the wheel contact line 19 defines a lever arm that acts upon the wheel bearing mounting section in an understeering direction of the wheel 21 due to the lateral forces acting upon the wheel 21. The actuator 11 does not have to be actuated if it is merely intended to realize understeering of the wheel 21 in order to counteract possible oversteering of the wheel 21 (e.g., in a torsion beam rear axle). However, the actuator 11 provides an additional option for pivoting the wheel bearing mounting section 1 relative to the control arm mounting section 2 (e.g., in order to increase or counteract the leverage).

Figure 4:
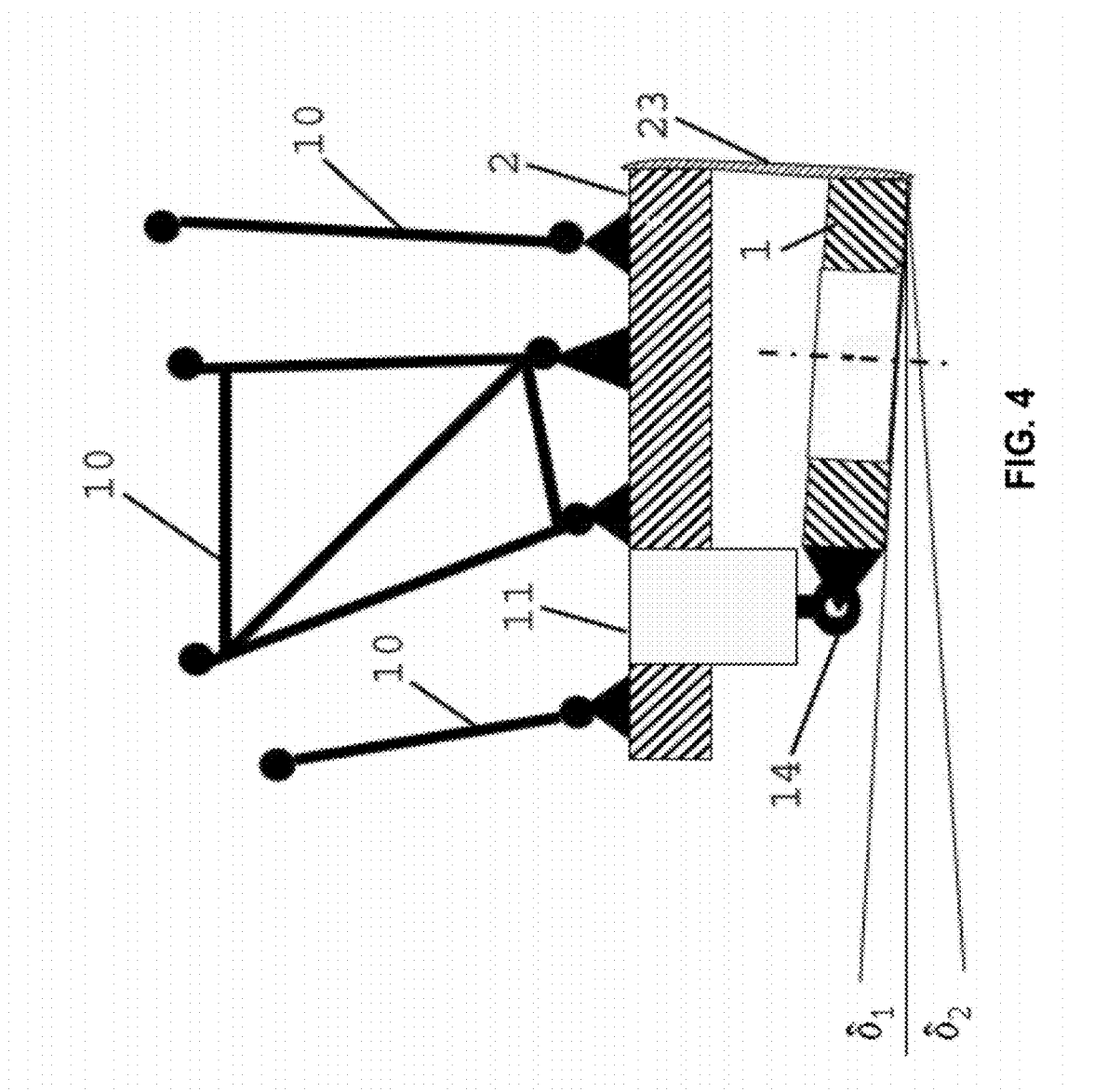
FIG. 4 shows a schematic top view of the second embodiment of the steering knuckle according to FIG. 3 with a control arm mounting section that is pivoted relative to the wheel bearing mounting section.

The following portion of the description refers to FIG. 3 and FIG. 4 that schematically show respective top views of the basic design of a second embodiment of the inventive steering knuckle. In order to avoid unnecessary repetitions, only the differences in comparison with the embodiments illustrated in FIG. 1 and FIG. 2 are discussed, and reference is made to the description of these figures in other respects.

In the embodiment of the steering knuckle according to FIG. 3 and FIG. 4, the steering knuckle is illustrated without the wheel bearing unit mounted thereon. In this case, an elastically deformable connecting section 23 is provided instead of the two leaf springs in order to elastically pivot the wheel bearing mounting section 1 relative to the control arm mounting section 2. The elastically deformable connecting section 23 is connected to a face of the wheel bearing mounting section that is directed toward the connecting section on one side and a face of the control arm mounting section 2 that is directed toward the wheel bearing mounting section on the other side. In FIG. 4, the wheel bearing mounting section 1 is pivoted toward the control arm mounting section 2 by an angle $\delta1$ referred to a neutral center position without an elastic deformation of the elastic connecting element 23, wherein a pivoting movement of the wheel bearing mounting section 1 away from the control arm mounting section 2 by an angle $\delta2$ is also indicated in this figure.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

The invention claimed is:

1. A steering knuckle for a wheel of a motor vehicle, comprising:
   a wheel bearing;
   a control arm mounting section; and
   a wheel bearing mounting section that serves to mount the wheel bearing with the control arm mounting section;
   wherein the wheel bearing mounting section is configured to be elastically pivoted relative to the control arm mounting section via a pair of leaf-spring elements defining a pivot axis therebetween, wherein the pivot axis is oriented at a non-zero angle with respect to the contact plane of the wheel and intersects a contact line of the wheel.

2. The steering knuckle according to claim 1, wherein the pair of leaf springs are arranged at a predetermined distance from one another.

3. The steering knuckle according to claim 1, wherein the pivoting axis is oriented in such a way that it traverses the contact plane of the wheel behind a wheel contact line referred to a forward moving direction of the wheel.

4. The steering knuckle according to claim 1, wherein the pivoting axis is oriented in such a way that it traverses the contact plane in a vicinity of a wheel contact line of the wheel.

5. The steering knuckle according to claim 1, wherein the pivoting axis is oriented in such a way that it intersects a contact line of the wheel.

6. The steering knuckle according to claim 1, wherein an actuating element is provided that engages on the wheel bearing mounting section and is suitably arranged for pivoting the wheel bearing mounting section relative to the control arm mounting section.

7. The steering knuckle according to claim 6, wherein the actuating element is arranged on the control arm mounting section.

* * * * *